US012759198B2

(12) United States Patent
Naik et al.

(10) Patent No.: US 12,759,198 B2
(45) **Date of Patent: *Oct. 13, 2026**

(54) METHOD FOR PREPARING A DENSIFIED INSULATION MATERIAL FOR USE IN APPLIANCE INSULATED STRUCTURE

(71) Applicant: WHIRLPOOL CORPORATION, Benton Harbor, MI (US)

(72) Inventors: Abhay Naik, Stevensville, MI (US); Lakshya J. Deka, Mishiwaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,006

(22) Filed: Dec. 27, 2024

(65) Prior Publication Data

US 2025/0128454 A1 Apr. 24, 2025

Related U.S. Application Data

(60) Division of application No. 18/311,277, filed on May 3, 2023, now Pat. No. 12,202,175, which is a division (Continued)

(51) Int. Cl.
*B29C 43/00* (2006.01)
*B01F 27/95* (2022.01)

(Continued)

(52) U.S. Cl.
CPC .......... *B29C 43/006* (2013.01); *B01F 27/953* (2022.01); *B29C 70/58* (2013.01);

(Continued)

(58) Field of Classification Search
None
See application file for complete search history.

(56) References Cited

U.S. PATENT DOCUMENTS

| | | | |
|---|---|---|---|
| 948,541 | A | 2/1910 | Coleman |
| 1,275,511 | A | 8/1918 | Welch |

(Continued)

FOREIGN PATENT DOCUMENTS

| | | | |
|---|---|---|---|
| CA | 626838 | A | 5/1961 |
| CA | 1320631 | | 7/1993 |

(Continued)

OTHER PUBLICATIONS

Cai et al., "Generation of Metal Nanoparticles By Laser Ablation of Microspheres," J. Aerosol Sci., vol. 29, No. 5/6 (1998), pp. 627-636.

(Continued)

*Primary Examiner* — Armand Melendez
(74) *Attorney, Agent, or Firm* — Price Heneveld LLP

(57) ABSTRACT

A method for forming a vacuum insulated structure using a prepared core material includes preparing a powder insulation material defining a bulk density, pre-densifying the powder insulation material to form a pre-densified insulation base, crushing the pre-densified insulation base into granular core insulation to define a core density of the granular core insulation, disposing the granular core insulation having the core density into an insulating cavity defined within an insulating structure and expressing gas from the interior cavity of the insulating structure to further densify the granular core insulation to define a target density. The granular core insulation defines the target density disposed within the insulating structure defines the vacuum insulation structure, wherein the target density defines a density in the range of from approximately 80 grams per liter to approximately 350 grams per liter.

20 Claims, 7 Drawing Sheets

Method 400 for Forming a Vacuum Insulated Structure using a Prepared Core Material

Related U.S. Application Data of application No. 17/361,907, filed on Jun. 29, 2021, now Pat. No. 11,691,318, which is a continuation of application No. 14/961,934, filed on Dec. 8, 2015, now Pat. No. 11,052,579.

(51) Int. Cl.

| | |
|---|---|
| ***B29C 70/58*** | (2006.01) |
| ***B29L 31/00*** | (2006.01) |
| *B29K 105/00* | (2006.01) |
| *B29K 105/04* | (2006.01) |
| *B29K 105/16* | (2006.01) |
| *B29K 503/08* | (2006.01) |
| *B29K 509/00* | (2006.01) |

(52) U.S. Cl.

CPC .... *B29K 2105/04* (2013.01); *B29K 2105/165* (2013.01); *B29K 2105/251* (2013.01); *B29K 2503/08* (2013.01); *B29K 2509/00* (2013.01); *B29K 2995/0015* (2013.01); *B29K 2995/0063* (2013.01); *B29L 2031/7622* (2013.01)

(56) References Cited

U.S. PATENT DOCUMENTS 1,849,369 A 3/1932 Frost
1,921,576 A 8/1933 Muffly
2,108,212 A 2/1938 Schellens
2,128,336 A 8/1938 Torstensson
2,164,143 A 6/1939 Munters
2,191,659 A 2/1940 Hintze
2,318,744 A 5/1943 Brown
2,356,827 A 8/1944 Coss et al.
2,432,042 A 12/1947 Richard
2,439,602 A 4/1948 Heritage
2,439,603 A 4/1948 Heritage
2,451,884 A 10/1948 Stelzer
2,538,780 A 1/1951 Hazard
2,559,356 A 7/1951 Hedges
2,729,863 A 1/1956 Kurtz
2,768,046 A 10/1956 Evans
2,817,123 A 12/1957 Jacobs
2,942,438 A 6/1960 Schmeling
2,985,075 A 5/1961 Knutsson-Hall
2,989,156 A 6/1961 Brooks
3,086,830 A 4/1963 Malia
3,125,388 A 3/1964 Constantini et al.
3,137,900 A 6/1964 Carbary
3,218,111 A 11/1965 Steiner
3,258,883 A 7/1966 Companaro et al.
3,290,893 A 12/1966 Haldopoulos
3,338,451 A 8/1967 Kesling
3,353,301 A 11/1967 Heilweil et al.
3,353,321 A 11/1967 Heilweil et al.
3,358,059 A 12/1967 Snyder
3,379,481 A 4/1968 Fisher
3,408,316 A 10/1968 Mueller et al.
3,471,416 A 10/1969 Fijal
3,597,850 A 8/1971 Jenkins
3,607,169 A 9/1971 Coxe
3,632,012 A 1/1972 Kitson
3,633,783 A 1/1972 Aue
3,634,971 A 1/1972 Kesling
3,635,536 A 1/1972 Lackey et al.
3,670,521 A 6/1972 Dodge, III et al.
3,688,384 A 9/1972 Mizushima et al.
3,769,770 A 11/1973 Deschamps et al.
3,862,880 A 1/1975 Feldman
3,868,829 A 3/1975 Mann et al.
3,875,683 A 4/1975 Waters
3,910,658 A 10/1975 Lindenschmidt
3,933,398 A 1/1976 Haag
3,935,787 A 2/1976 Fisher
4,005,919 A 2/1977 Hoge et al.
4,006,947 A 2/1977 Haag et al.
4,043,624 A 8/1977 Lindenschmidt
4,050,145 A 9/1977 Benford
4,067,628 A 1/1978 Sherburn
4,170,391 A 10/1979 Bottger
4,242,241 A 12/1980 Rosen et al.
4,260,876 A 4/1981 Hochheiser
4,303,730 A 12/1981 Torobin
4,303,732 A 12/1981 Torobin
4,325,734 A 4/1982 Burrage et al.
4,330,310 A 5/1982 Tate, Jr. et al.
4,332,429 A 6/1982 Frick et al.
4,396,362 A 8/1983 Thompson et al.
4,417,382 A 11/1983 Schilf
4,492,368 A 1/1985 DeLeeuw et al.
4,529,368 A 7/1985 Makansi
4,548,196 A 10/1985 Torobin
4,583,796 A 4/1986 Nakajima et al.
4,660,271 A 4/1987 Lenhardt
4,671,909 A 6/1987 Torobin
4,671,985 A 6/1987 Rodrigues et al.
4,681,788 A 7/1987 Barito et al.
4,745,015 A 5/1988 Cheng et al.
4,777,154 A 10/1988 Torobin
4,781,968 A 11/1988 Kellerman
4,805,293 A 2/1989 Buchser
4,865,875 A 9/1989 Kellerman
4,870,735 A 10/1989 Jahr et al.
4,914,341 A 4/1990 Weaver et al.
4,917,841 A 4/1990 Jenkins
4,955,675 A 9/1990 Donaghy
5,007,226 A 4/1991 Nelson
5,018,328 A 5/1991 Cur et al.
5,033,636 A 7/1991 Jenkins
5,066,437 A 11/1991 Barito et al.
5,082,335 A 1/1992 Cur et al.
5,084,320 A 1/1992 Barito et al.
5,094,899 A 3/1992 Rusek, Jr.
5,118,174 A 6/1992 Benford et al.
5,121,593 A 6/1992 Forslund
5,157,893 A 10/1992 Benson et al.
5,168,674 A 12/1992 Molthen
5,171,346 A 12/1992 Hallett
5,175,975 A 1/1993 Benson et al.
5,212,143 A 5/1993 Torobin
5,221,136 A 6/1993 Hauck et al.
5,227,245 A 7/1993 Brands et al.
5,231,811 A 8/1993 Andrepont et al.
5,248,196 A 9/1993 Lynn et al.
5,251,455 A 10/1993 Cur et al.
5,252,408 A 10/1993 Bridges et al.
5,263,773 A 11/1993 Gable et al.
5,273,801 A 12/1993 Barry et al.
5,318,108 A 6/1994 Benson et al.
5,340,208 A 8/1994 Hauck et al.
5,353,868 A 10/1994 Abbott
5,359,795 A 11/1994 Mawby et al.
5,375,428 A 12/1994 LeClear et al.
5,397,759 A 3/1995 Torobin
5,418,055 A 5/1995 Chen et al.
5,433,056 A 7/1995 Benson et al.
5,477,676 A 12/1995 Benson et al.
5,500,287 A 3/1996 Henderson
5,500,305 A 3/1996 Bridges et al.
5,505,810 A 4/1996 Kirby et al.
5,507,999 A 4/1996 Copsey et al.
5,509,248 A 4/1996 Dellby et al.
5,512,345 A 4/1996 Tsutsumi et al.
5,532,034 A 7/1996 Kirby et al.
5,533,311 A 7/1996 Tirrell et al.
5,562,154 A 10/1996 Benson et al.
5,586,680 A 12/1996 Dellby et al.
5,599,081 A 2/1997 Revlett et al.
5,600,966 A 2/1997 Valence et al.
5,632,543 A 5/1997 McGrath et al.
5,640,828 A 6/1997 Reeves et al.
5,643,485 A 7/1997 Potter et al.
5,652,039 A 7/1997 Tremain et al.
5,716,581 A 2/1998 Tirrell et al.

(56) References Cited

U.S. PATENT DOCUMENTS

| | | | |
|---|---|---|---|
| 5,768,837 | A | 6/1998 | Sjoholm |
| 5,792,801 | A | 8/1998 | Tsuda et al. |
| 5,813,454 | A | 9/1998 | Potter |
| 5,826,780 | A | 10/1998 | Nesser et al. |
| 5,827,385 | A | 10/1998 | Meyer et al. |
| 5,834,126 | A | 11/1998 | Sheu |
| 5,843,353 | A | 12/1998 | DeVos et al. |
| 5,866,228 | A | 2/1999 | Awata |
| 5,866,247 | A | 2/1999 | Klatt et al. |
| 5,868,890 | A | 2/1999 | Fredrick |
| 5,900,299 | A | 5/1999 | Wynne |
| 5,918,478 | A | 7/1999 | Bostic et al. |
| 5,924,295 | A | 7/1999 | Park |
| 5,950,395 | A | 9/1999 | Takemasa et al. |
| 5,952,404 | A | 9/1999 | Simpson et al. |
| 5,966,963 | A | 10/1999 | Kovalaske |
| 5,985,189 | A | 11/1999 | Lynn et al. |
| 6,001,450 | A | 12/1999 | Tanimoto et al. |
| 6,013,700 | A | 1/2000 | Asano et al. |
| 6,063,471 | A | 5/2000 | Dietrich et al. |
| 6,094,922 | A | 8/2000 | Ziegler |
| 6,109,712 | A | 8/2000 | Haworth et al. |
| 6,128,914 | A | 10/2000 | Tamaoki et al. |
| 6,132,837 | A | 10/2000 | Boes et al. |
| 6,158,233 | A | 12/2000 | Cohen et al. |
| 6,163,976 | A | 12/2000 | Tada et al. |
| 6,164,030 | A | 12/2000 | Dietrich |
| 6,164,739 | A | 12/2000 | Schulz et al. |
| 6,187,256 | B1 | 2/2001 | Aslan et al. |
| 6,209,342 | B1 | 4/2001 | Banicevic et al. |
| 6,210,625 | B1 | 4/2001 | Matsushita et al. |
| 6,220,473 | B1 | 4/2001 | Lehman et al. |
| 6,221,456 | B1 | 4/2001 | Pogorski et al. |
| 6,224,179 | B1 | 5/2001 | Wenning et al. |
| 6,244,458 | B1 | 6/2001 | Frysinger et al. |
| 6,260,377 | B1 | 7/2001 | Tamaoki et al. |
| 6,266,970 | B1 | 7/2001 | Nam et al. |
| 6,294,595 | B1 | 9/2001 | Tyagi et al. |
| 6,305,768 | B1 | 10/2001 | Nishimoto |
| 6,390,378 | B1 | 5/2002 | Briscoe, Jr. et al. |
| 6,406,449 | B1 | 6/2002 | Moore et al. |
| 6,408,841 | B1 | 6/2002 | Hirath et al. |
| 6,415,623 | B1 | 7/2002 | Jennings et al. |
| 6,428,130 | B1 | 8/2002 | Banicevic et al. |
| 6,430,780 | B1 | 8/2002 | Kim et al. |
| 6,460,955 | B1 | 10/2002 | Vaughan et al. |
| 6,485,122 | B2 | 11/2002 | Wolf et al. |
| 6,519,919 | B1 | 2/2003 | Takenouchi et al. |
| 6,623,413 | B1 | 9/2003 | Wynne |
| 6,629,429 | B1 | 10/2003 | Kawamura et al. |
| 6,651,444 | B2 | 11/2003 | Morimoto et al. |
| 6,655,766 | B2 | 12/2003 | Hodges |
| 6,689,840 | B1 | 2/2004 | Eustace et al. |
| 6,716,501 | B2 | 4/2004 | Kovalchuk et al. |
| 6,736,472 | B2 | 5/2004 | Banicevic |
| 6,749,780 | B2 | 6/2004 | Tobias |
| 6,773,082 | B2 | 8/2004 | Lee |
| 6,858,280 | B2 | 2/2005 | Allen et al. |
| 6,860,082 | B1 | 3/2005 | Yamamoto et al. |
| 6,938,968 | B2 | 9/2005 | Tanimoto et al. |
| 6,997,530 | B2 | 2/2006 | Avendano et al. |
| 7,008,032 | B2 | 3/2006 | Chekal et al. |
| 7,026,054 | B2 | 4/2006 | Ikegawa et al. |
| 7,197,792 | B2 | 4/2007 | Moon |
| 7,197,888 | B2 | 4/2007 | LeClear et al. |
| 7,207,181 | B2 | 4/2007 | Murray et al. |
| 7,210,308 | B2 | 5/2007 | Tanimoto et al. |
| 7,234,247 | B2 | 6/2007 | Maguire |
| 7,263,744 | B2 | 9/2007 | Kim et al. |
| 7,278,279 | B2 | 10/2007 | Hirai et al. |
| 7,284,390 | B2 | 10/2007 | Van Meter et al. |
| 7,296,432 | B2 | 11/2007 | Muller et al. |
| 7,316,125 | B2 | 1/2008 | Uekado et al. |
| 7,343,757 | B2 | 3/2008 | Egan et al. |
| 7,360,371 | B2 | 4/2008 | Feinauer et al. |
| 7,386,992 | B2 | 6/2008 | Adamski et al. |
| 7,449,227 | B2 | 11/2008 | Echigoya et al. |
| 7,475,562 | B2 | 1/2009 | Jackovin |
| 7,517,031 | B2 | 4/2009 | Laible |
| 7,517,576 | B2 | 4/2009 | Echigoya et al. |
| 7,537,817 | B2 | 5/2009 | Tsunetsugu et al. |
| 7,614,244 | B2 | 11/2009 | Venkatakrishnan et al. |
| 7,625,622 | B2 | 12/2009 | Teckoe et al. |
| 7,641,298 | B2 | 1/2010 | Hirath et al. |
| 7,665,326 | B2 | 2/2010 | LeClear et al. |
| 7,703,217 | B2 | 4/2010 | Tada et al. |
| 7,703,824 | B2 | 4/2010 | Kittelson et al. |
| 7,757,511 | B2 | 7/2010 | LeClear et al. |
| 7,762,634 | B2 | 7/2010 | Tenra et al. |
| 7,794,805 | B2 | 9/2010 | Aumaugher et al. |
| 7,815,269 | B2 | 10/2010 | Wenning et al. |
| 7,842,269 | B2 | 11/2010 | Schachtely et al. |
| 7,845,745 | B2 | 12/2010 | Gorz et al. |
| 7,861,538 | B2 | 1/2011 | Welle et al. |
| 7,886,559 | B2 | 2/2011 | Hell et al. |
| 7,893,123 | B2 | 2/2011 | Luisi |
| 7,905,614 | B2 | 3/2011 | Aoki |
| 7,908,873 | B1 | 3/2011 | Cur et al. |
| 7,930,892 | B1 | 4/2011 | Vonderhaar |
| 7,938,148 | B2 | 5/2011 | Carlier et al. |
| 7,992,257 | B2 | 8/2011 | Kim |
| 8,049,518 | B2 | 11/2011 | Wern et al. |
| 8,074,469 | B2 | 12/2011 | Hamel et al. |
| 8,079,652 | B2 | 12/2011 | Laible et al. |
| 8,083,985 | B2 | 12/2011 | Luisi et al. |
| 8,108,972 | B2 | 2/2012 | Bae et al. |
| 8,113,604 | B2 | 2/2012 | Olson et al. |
| 8,117,865 | B2 | 2/2012 | Allard et al. |
| 8,157,338 | B2 | 4/2012 | Seo et al. |
| 8,162,415 | B2 | 4/2012 | Hagele et al. |
| 8,163,080 | B2 | 4/2012 | Meyer et al. |
| 8,176,746 | B2 | 5/2012 | Allard et al. |
| 8,182,051 | B2 | 5/2012 | Laible et al. |
| 8,197,019 | B2 | 6/2012 | Kim |
| 8,202,599 | B2 | 6/2012 | Henn |
| 8,211,523 | B2 | 7/2012 | Fujimori et al. |
| 8,266,923 | B2 | 9/2012 | Bauer et al. |
| 8,281,558 | B2 | 10/2012 | Hiemeyer et al. |
| 8,299,545 | B2 | 10/2012 | Chen et al. |
| 8,299,656 | B2 | 10/2012 | Allard et al. |
| 8,343,395 | B2 | 1/2013 | Hu et al. |
| 8,353,177 | B2 | 1/2013 | Adamski et al. |
| 8,382,219 | B2 | 2/2013 | Hottmann et al. |
| 8,434,317 | B2 | 5/2013 | Besore |
| 8,439,460 | B2 | 5/2013 | Laible et al. |
| 8,453,476 | B2 | 6/2013 | Kendall et al. |
| 8,456,040 | B2 | 6/2013 | Allard et al. |
| 8,491,070 | B2 | 7/2013 | Davis et al. |
| 8,516,845 | B2 | 8/2013 | Wuesthoff et al. |
| 8,522,563 | B2 | 9/2013 | Allard et al. |
| 8,528,284 | B2 | 9/2013 | Aspenson et al. |
| 8,590,992 | B2 | 11/2013 | Lim et al. |
| 8,717,029 | B2 | 5/2014 | Chae et al. |
| 8,726,690 | B2 | 5/2014 | Cur et al. |
| 8,733,123 | B2 | 5/2014 | Adamski et al. |
| 8,739,567 | B2 | 6/2014 | Junge |
| 8,739,568 | B2 | 6/2014 | Allard et al. |
| 8,752,918 | B2 | 6/2014 | Kang |
| 8,752,921 | B2 | 6/2014 | Gorz et al. |
| 8,756,952 | B2 | 6/2014 | Adamski et al. |
| 8,763,847 | B2 | 7/2014 | Mortarotti |
| 8,764,133 | B2 | 7/2014 | Park et al. |
| 8,770,682 | B2 | 7/2014 | Lee et al. |
| 8,776,390 | B2 | 7/2014 | Hanaoka et al. |
| 8,790,477 | B2 | 7/2014 | Tenra et al. |
| 8,840,204 | B2 | 9/2014 | Bauer et al. |
| 8,852,708 | B2 | 10/2014 | Kim et al. |
| 8,871,323 | B2 | 10/2014 | Kim et al. |
| 8,881,398 | B2 | 11/2014 | Hanley et al. |
| 8,899,068 | B2 | 12/2014 | Jung et al. |
| 8,905,503 | B2 | 12/2014 | Sahasrabudhe et al. |
| 8,927,084 | B2 | 1/2015 | Jeon et al. |
| 8,943,770 | B2 | 2/2015 | Sanders et al. |
| 8,944,541 | B2 | 2/2015 | Allard et al. |

(56) References Cited

U.S. PATENT DOCUMENTS

| | | | |
|---|---|---|---|
| 8,955,352 | B2 | 2/2015 | Lee et al. |
| 8,986,483 | B2 | 3/2015 | Cur et al. |
| 9,009,969 | B2 | 4/2015 | Choi et al. |
| RE45,501 | E | 5/2015 | Maguire |
| 9,038,403 | B2 | 5/2015 | Cur et al. |
| 9,056,952 | B2 | 6/2015 | Eilbracht et al. |
| 9,071,907 | B2 | 6/2015 | Kuehl et al. |
| 9,074,811 | B2 | 7/2015 | Korkmaz |
| 9,080,808 | B2 | 7/2015 | Choi et al. |
| 9,102,076 | B2 | 8/2015 | Doshi et al. |
| 9,103,482 | B2 | 8/2015 | Fujimori et al. |
| 9,125,546 | B2 | 9/2015 | Kleemann et al. |
| 9,140,480 | B2 | 9/2015 | Kuehl et al. |
| 9,140,481 | B2 | 9/2015 | Cur et al. |
| 9,170,045 | B2 | 10/2015 | Oh et al. |
| 9,170,046 | B2 | 10/2015 | Jung et al. |
| 9,182,158 | B2 | 11/2015 | Wu |
| 9,188,382 | B2 | 11/2015 | Kim et al. |
| 9,221,210 | B2 | 12/2015 | Wu et al. |
| 9,228,386 | B2 | 1/2016 | Thielmann et al. |
| 9,252,570 | B2 | 2/2016 | Allard et al. |
| 9,267,727 | B2 | 2/2016 | Lim et al. |
| 9,303,915 | B2 | 4/2016 | Kim et al. |
| 9,328,951 | B2 | 5/2016 | Shin et al. |
| 9,353,984 | B2 | 5/2016 | Kim et al. |
| 9,410,732 | B2 | 8/2016 | Choi et al. |
| 9,423,171 | B2 | 8/2016 | Betto et al. |
| 9,429,356 | B2 | 8/2016 | Kim et al. |
| 9,448,004 | B2 | 9/2016 | Kim et al. |
| 9,463,917 | B2 | 10/2016 | Wu et al. |
| 9,482,463 | B2 | 11/2016 | Choi et al. |
| 9,506,689 | B2 | 11/2016 | Carbajal et al. |
| 9,518,777 | B2 | 12/2016 | Lee et al. |
| 9,568,238 | B2 | 2/2017 | Kim et al. |
| D781,641 | S | 3/2017 | Incukur |
| D781,642 | S | 3/2017 | Incukur |
| 9,605,891 | B2 | 3/2017 | Lee et al. |
| 9,696,085 | B2 | 7/2017 | Seo et al. |
| 9,702,621 | B2 | 7/2017 | Cho et al. |
| 9,759,479 | B2 | 9/2017 | Ramm et al. |
| 9,777,958 | B2 | 10/2017 | Choi et al. |
| 9,791,204 | B2 | 10/2017 | Kim et al. |
| 9,833,942 | B2 | 12/2017 | Wu et al. |
| 11,052,579 | B2 | 7/2021 | Deka et al. |
| 2002/0004111 | A1 | 1/2002 | Matsubara et al. |
| 2002/0114937 | A1 | 8/2002 | Albert et al. |
| 2002/0144482 | A1 | 10/2002 | Henson et al. |
| 2002/0168496 | A1 | 11/2002 | Morimoto et al. |
| 2003/0008100 | A1 | 1/2003 | Horn |
| 2003/0041612 | A1 | 3/2003 | Piloni et al. |
| 2003/0056334 | A1 | 3/2003 | Finkelstein |
| 2003/0157284 | A1 | 8/2003 | Tanimoto et al. |
| 2003/0167789 | A1 | 9/2003 | Tanimoto et al. |
| 2003/0173883 | A1 | 9/2003 | Koons |
| 2004/0012114 | A1 | 1/2004 | Eyerer et al. |
| 2004/0144130 | A1 | 7/2004 | Jung |
| 2004/0178707 | A1 | 9/2004 | Avendano |
| 2004/0180176 | A1 | 9/2004 | Rusek |
| 2004/0226141 | A1 | 11/2004 | Yates et al. |
| 2004/0253406 | A1 | 12/2004 | Hayashi et al. |
| 2005/0042247 | A1 | 2/2005 | Gomoll et al. |
| 2005/0229614 | A1 | 10/2005 | Ansted |
| 2005/0235682 | A1 | 10/2005 | Hirai et al. |
| 2006/0064846 | A1 | 3/2006 | Espindola et al. |
| 2006/0076863 | A1 | 4/2006 | Echigoya et al. |
| 2006/0201189 | A1 | 9/2006 | Adamski et al. |
| 2006/0261718 | A1 | 11/2006 | Miseki et al. |
| 2006/0263571 | A1 | 11/2006 | Tsunetsugu et al. |
| 2006/0266075 | A1 | 11/2006 | Itsuki et al. |
| 2007/0001563 | A1 | 1/2007 | Park et al. |
| 2007/0099502 | A1 | 5/2007 | Ferinauer |
| 2007/0176526 | A1 | 8/2007 | Gomoll et al. |
| 2007/0266654 | A1 | 11/2007 | Noale |
| 2008/0044488 | A1 | 2/2008 | Zimmer et al. |
| 2008/0048540 | A1 | 2/2008 | Kim |
| 2008/0138458 | A1 | 6/2008 | Ozasa et al. |
| 2008/0196441 | A1 | 8/2008 | Ferreira |
| 2008/0300356 | A1 | 12/2008 | Meyer et al. |
| 2008/0309210 | A1 | 12/2008 | Luisi et al. |
| 2009/0032541 | A1 | 2/2009 | Rogala et al. |
| 2009/0056367 | A1 | 3/2009 | Neumann |
| 2009/0058244 | A1 | 3/2009 | Cho et al. |
| 2009/0113925 | A1 | 5/2009 | Korkmaz |
| 2009/0131571 | A1 | 5/2009 | Fraser et al. |
| 2009/0179541 | A1 | 7/2009 | Smith et al. |
| 2009/0205357 | A1 | 8/2009 | Lim et al. |
| 2009/0302728 | A1 | 12/2009 | Rotter et al. |
| 2009/0322470 | A1 | 12/2009 | Yoo et al. |
| 2009/0324871 | A1 | 12/2009 | Henn |
| 2010/0206464 | A1 | 8/2010 | Heo et al. |
| 2010/0218543 | A1 | 9/2010 | Duchame |
| 2010/0231109 | A1 | 9/2010 | Matzke et al. |
| 2010/0287843 | A1 | 11/2010 | Oh |
| 2010/0287974 | A1 | 11/2010 | Cur et al. |
| 2010/0293984 | A1 | 11/2010 | Adamski et al. |
| 2010/0295435 | A1 | 11/2010 | Kendall et al. |
| 2011/0011119 | A1 | 1/2011 | Kuehl et al. |
| 2011/0023527 | A1 | 2/2011 | Kwon et al. |
| 2011/0030894 | A1 | 2/2011 | Tenra et al. |
| 2011/0095669 | A1 | 4/2011 | Moon et al. |
| 2011/0146325 | A1 | 6/2011 | Lee |
| 2011/0146335 | A1 | 6/2011 | Jung et al. |
| 2011/0165367 | A1 | 7/2011 | Kojima et al. |
| 2011/0215694 | A1 | 9/2011 | Fink et al. |
| 2011/0220662 | A1 | 9/2011 | Kim et al. |
| 2011/0241513 | A1 | 10/2011 | Nomura et al. |
| 2011/0241514 | A1 | 10/2011 | Nomura et al. |
| 2011/0260351 | A1 | 10/2011 | Corradi et al. |
| 2011/0290808 | A1 | 12/2011 | Bai et al. |
| 2011/0309732 | A1 | 12/2011 | Horil et al. |
| 2011/0315693 | A1 | 12/2011 | Cur et al. |
| 2012/0000234 | A1 | 1/2012 | Adamski et al. |
| 2012/0011879 | A1 | 1/2012 | Gu |
| 2012/0060544 | A1 | 3/2012 | Lee et al. |
| 2012/0099255 | A1 | 4/2012 | Lee et al. |
| 2012/0103006 | A1 | 5/2012 | Jung et al. |
| 2012/0104923 | A1 | 5/2012 | Jung et al. |
| 2012/0118002 | A1 | 5/2012 | Kim et al. |
| 2012/0137501 | A1 | 6/2012 | Allard et al. |
| 2012/0152151 | A1 | 6/2012 | Meyer et al. |
| 2012/0196059 | A1 | 8/2012 | Fujimori et al. |
| 2012/0231204 | A1 | 9/2012 | Jeon et al. |
| 2012/0237715 | A1 | 9/2012 | McCracken |
| 2012/0240612 | A1 | 9/2012 | Wusthoff et al. |
| 2012/0273111 | A1 | 11/2012 | Nomura et al. |
| 2012/0279247 | A1 | 11/2012 | Katu et al. |
| 2012/0280608 | A1 | 11/2012 | Park et al. |
| 2012/0285971 | A1 | 11/2012 | Junge et al. |
| 2012/0297813 | A1 | 11/2012 | Hanley et al. |
| 2012/0324937 | A1 | 12/2012 | Adamski et al. |
| 2013/0026900 | A1 | 1/2013 | Oh et al. |
| 2013/0033163 | A1 | 2/2013 | Kang |
| 2013/0043780 | A1 | 2/2013 | Ootsuka et al. |
| 2013/0052393 | A1 | 2/2013 | Hahn et al. |
| 2013/0068990 | A1 | 3/2013 | Eilbracht et al. |
| 2013/0111941 | A1 | 5/2013 | Yu et al. |
| 2013/0221819 | A1 | 8/2013 | Wing |
| 2013/0255304 | A1 | 10/2013 | Cur et al. |
| 2013/0256318 | A1 | 10/2013 | Kuehl et al. |
| 2013/0256319 | A1 | 10/2013 | Kuehl et al. |
| 2013/0257256 | A1 | 10/2013 | Allard et al. |
| 2013/0257257 | A1 | 10/2013 | Cur et al. |
| 2013/0264439 | A1 | 10/2013 | Allard et al. |
| 2013/0270732 | A1 | 10/2013 | Wu et al. |
| 2013/0285527 | A1 | 10/2013 | Choi et al. |
| 2013/0293080 | A1 | 11/2013 | Kim et al. |
| 2013/0305535 | A1 | 11/2013 | Cur et al. |
| 2013/0328472 | A1 | 12/2013 | Shim et al. |
| 2014/0009055 | A1 | 1/2014 | Cho et al. |
| 2014/0097733 | A1 | 4/2014 | Seo et al. |
| 2014/0132144 | A1 | 5/2014 | Kim et al. |
| 2014/0166926 | A1 | 6/2014 | Lee et al. |
| 2014/0171578 | A1 | 6/2014 | Meyer et al. |
| 2014/0190978 | A1 | 7/2014 | Bowman et al. |

(56) References Cited

U.S. PATENT DOCUMENTS

| | | | |
|---|---|---|---|
| 2014/0196305 | A1 | 7/2014 | Smith |
| 2014/0216706 | A1 | 8/2014 | Melton et al. |
| 2014/0232250 | A1 | 8/2014 | Kim et al. |
| 2014/0260332 | A1 | 9/2014 | Wu |
| 2014/0346942 | A1 | 11/2014 | Kim et al. |
| 2014/0364527 | A1 | 12/2014 | Matthias et al. |
| 2015/0011668 | A1 | 1/2015 | Kolb et al. |
| 2015/0015133 | A1 | 1/2015 | Carbajal et al. |
| 2015/0017386 | A1 | 1/2015 | Kolb et al. |
| 2015/0027628 | A1 | 1/2015 | Cravens et al. |
| 2015/0059399 | A1 | 3/2015 | Hwang et al. |
| 2015/0115790 | A1 | 4/2015 | Ogg |
| 2015/0147514 | A1 | 5/2015 | Shinohara et al. |
| 2015/0159936 | A1 | 6/2015 | Oh et al. |
| 2015/0168050 | A1 | 6/2015 | Cur et al. |
| 2015/0176888 | A1 | 6/2015 | Cur et al. |
| 2015/0184923 | A1 | 7/2015 | Jeon |
| 2015/0190840 | A1 | 7/2015 | Muto et al. |
| 2015/0224685 | A1 | 8/2015 | Amstutz |
| 2015/0241115 | A1 | 8/2015 | Strauss et al. |
| 2015/0241118 | A1 | 8/2015 | Wu |
| 2015/0285551 | A1 | 10/2015 | Aiken et al. |
| 2016/0084567 | A1 | 3/2016 | Fernandez et al. |
| 2016/0116100 | A1 | 4/2016 | Thiery et al. |
| 2016/0123055 | A1 | 5/2016 | Ueyama |
| 2016/0161175 | A1 | 6/2016 | Benold et al. |
| 2016/0178267 | A1 | 6/2016 | Hao et al. |
| 2016/0178269 | A1 | 6/2016 | Hiemeyer et al. |
| 2016/0235201 | A1 | 8/2016 | Soot |
| 2016/0240839 | A1 | 8/2016 | Umeyama et al. |
| 2016/0258671 | A1 | 9/2016 | Allard et al. |
| 2016/0290702 | A1 | 10/2016 | Sexton et al. |
| 2016/0348957 | A1 | 12/2016 | Hitzelberger et al. |
| 2017/0038126 | A1 | 2/2017 | Lee et al. |
| 2017/0157809 | A1 | 6/2017 | Deka et al. |
| 2017/0176086 | A1 | 6/2017 | Kang |
| 2017/0184339 | A1 | 6/2017 | Liu et al. |
| 2017/0191746 | A1 | 7/2017 | Seo |
| 2017/0232640 | A1 | 8/2017 | Hollar, Jr. et al. |
| 2021/0323200 | A1 | 10/2021 | Naik et al. |

FOREIGN PATENT DOCUMENTS

| | | | |
|---|---|---|---|
| CA | 2259665 | | 1/1998 |
| CA | 2640006 | | 8/2007 |
| CN | 1158509 | | 7/2004 |
| CN | 1970185 | | 5/2007 |
| CN | 100359272 | | 1/2008 |
| CN | 101437756 | | 5/2009 |
| CN | 201680116 | | 12/2010 |
| CN | 201748744 | U | 2/2011 |
| CN | 102296714 | | 5/2012 |
| CN | 102452522 | | 5/2012 |
| CN | 102717578 | A | 10/2012 |
| CN | 102720277 | | 10/2012 |
| CN | 103072321 | | 5/2013 |
| CN | 202973713 | U | 6/2013 |
| CN | 203331442 | | 12/2013 |
| CN | 104816478 | A | 8/2015 |
| CN | 105115221 | | 12/2015 |
| CN | 2014963379 | U | 1/2016 |
| DE | 1150190 | | 6/1963 |
| DE | 3208686 | | 9/1983 |
| DE | 4110292 | A1 | 10/1992 |
| DE | 4409091 | | 9/1995 |
| DE | 19818890 | | 11/1999 |
| DE | 19914105 | | 9/2000 |
| DE | 19915311 | | 10/2000 |
| DE | 102008026528 | | 12/2009 |
| DE | 102009046810 | | 5/2011 |
| DE | 102010024951 | | 12/2011 |
| DE | 102011051178 | A1 | 12/2012 |
| DE | 102012223536 | | 6/2014 |
| DE | 102012223541 | | 6/2014 |
| DE | 102015222224 | | 5/2017 |
| EP | 0260699 | | 3/1988 |
| EP | 0480451 | | 4/1992 |
| EP | 0645576 | A1 | 3/1995 |
| EP | 0691518 | | 1/1996 |
| EP | 0860669 | | 8/1998 |
| EP | 1087186 | | 3/2001 |
| EP | 1200785 | | 5/2002 |
| EP | 1243880 | | 9/2002 |
| EP | 1496322 | | 1/2005 |
| EP | 1505359 | | 2/2005 |
| EP | 1602425 | A1 | 12/2005 |
| EP | 1624263 | A2 | 8/2006 |
| EP | 1484563 | | 10/2008 |
| EP | 2342511 | | 8/2012 |
| EP | 2543942 | A2 | 1/2013 |
| EP | 2607073 | | 6/2013 |
| EP | 2789951 | | 10/2014 |
| EP | 2878427 | A1 | 6/2015 |
| FR | 2980963 | | 4/2013 |
| FR | 2991698 | A1 | 12/2013 |
| GB | 837929 | | 6/1960 |
| GB | 1214548 | | 6/1960 |
| JP | 4828353 | | 8/1973 |
| JP | 51057777 | | 5/1976 |
| JP | 58168875 | | 10/1983 |
| JP | 59191588 | | 12/1984 |
| JP | 03013779 | | 1/1991 |
| JP | 404165197 | | 6/1992 |
| JP | 04165197 | | 10/1992 |
| JP | 04309778 | A | 11/1992 |
| JP | 06159922 | | 6/1994 |
| JP | 7001479 | | 1/1995 |
| JP | H07144955 | | 6/1995 |
| JP | H07167377 | | 7/1995 |
| JP | 08300052 | | 11/1996 |
| JP | H08303686 | | 11/1996 |
| JP | H09166271 | | 6/1997 |
| JP | 10113983 | | 5/1998 |
| JP | 11159693 | A | 6/1999 |
| JP | 11311395 | | 11/1999 |
| JP | 11336990 | | 12/1999 |
| JP | 2000097390 | | 4/2000 |
| JP | 2000117334 | | 4/2000 |
| JP | 2000320958 | A | 11/2000 |
| JP | 2001038188 | | 2/2001 |
| JP | 2001116437 | | 4/2001 |
| JP | 2001116443 | | 4/2001 |
| JP | 2001336691 | | 12/2001 |
| JP | 2001343176 | | 12/2001 |
| JP | 2002068853 | | 3/2002 |
| JP | 3438948 | | 8/2003 |
| JP | 03478771 | | 12/2003 |
| JP | 2004303695 | | 10/2004 |
| JP | 2005069596 | A | 3/2005 |
| JP | 2005098637 | A | 4/2005 |
| JP | 2005114015 | | 4/2005 |
| JP | 2005164193 | | 6/2005 |
| JP | 2005256849 | | 9/2005 |
| JP | 2006077792 | | 3/2006 |
| JP | 2006161834 | A | 6/2006 |
| JP | 2006161945 | | 6/2006 |
| JP | 03792801 | | 7/2006 |
| JP | 2006200685 | A | 8/2006 |
| JP | 2007263186 | | 10/2007 |
| JP | 4111096 | | 7/2008 |
| JP | 2008157431 | | 7/2008 |
| JP | 2008190815 | | 8/2008 |
| JP | 2009063064 | | 3/2009 |
| JP | 2009162402 | | 7/2009 |
| JP | 2009524570 | | 7/2009 |
| JP | 2010017437 | | 1/2010 |
| JP | 2010071565 | | 4/2010 |
| JP | 2010108199 | | 5/2010 |
| JP | 2010145002 | | 7/2010 |
| JP | 04545126 | B2 | 9/2010 |
| JP | 2010236770 | | 10/2010 |
| JP | 2010276309 | | 12/2010 |
| JP | 2011002033 | | 1/2011 |
| JP | 2011069612 | | 4/2011 |

(56) References Cited

FOREIGN PATENT DOCUMENTS

| | | | |
|---|---|---|---|
| JP | 04779684 | | 9/2011 |
| JP | 2011196644 | | 10/2011 |
| JP | 2012026493 | | 2/2012 |
| JP | 04897473 | | 3/2012 |
| JP | 2012063029 | | 3/2012 |
| JP | 2012087993 | | 5/2012 |
| JP | 2012163258 | | 8/2012 |
| JP | 2012189114 | | 10/2012 |
| JP | 2012242075 | | 12/2012 |
| JP | 2013002484 | | 1/2013 |
| JP | 2013050242 | | 3/2013 |
| JP | 2013050267 | A | 3/2013 |
| JP | 2013076471 | A | 4/2013 |
| JP | 2013088036 | | 5/2013 |
| JP | 2013195009 | | 9/2013 |
| KR | 20020057547 | | 7/2002 |
| KR | 20020080938 | | 10/2002 |
| KR | 20030083812 | | 11/2003 |
| KR | 20040000126 | | 1/2004 |
| KR | 20050095357 | A | 9/2005 |
| KR | 100620025 | B1 | 9/2006 |
| KR | 20070044024 | | 4/2007 |
| KR | 1020070065743 | A | 6/2007 |
| KR | 1020080103845 | | 11/2008 |
| KR | 20090026045 | | 3/2009 |
| KR | 1017776 | | 2/2011 |
| KR | 20120007241 | | 1/2012 |
| KR | 2012046621 | | 5/2012 |
| KR | 2012051305 | | 5/2012 |
| KR | 20150089495 | A | 8/2015 |
| RU | 2061925 | C1 | 6/1996 |
| RU | 2077411 | C1 | 4/1997 |
| RU | 2081858 | | 6/1997 |
| RU | 2132522 | C1 | 6/1999 |
| RU | 2162576 | C2 | 1/2001 |
| RU | 2166158 | C1 | 4/2001 |
| RU | 2187433 | C2 | 8/2002 |
| RU | 2234645 | C1 | 8/2004 |
| RU | 2252377 | | 5/2005 |
| RU | 2253792 | C2 | 6/2005 |
| RU | 2349618 | C2 | 3/2009 |
| RU | 2414288 | C2 | 3/2011 |
| RU | 2422598 | | 6/2011 |
| RU | 142892 | | 7/2014 |
| RU | 2529525 | C1 | 9/2014 |
| RU | 2013151025 | | 6/2015 |
| RU | 2571031 | | 12/2015 |
| SU | 203707 | | 12/1967 |
| SU | 00476407 | A1 | 7/1975 |
| SU | 547614 | | 5/1977 |
| SU | 648780 | A1 | 2/1979 |
| SU | 01307186 | A1 | 4/1987 |
| WO | 9614207 | | 5/1996 |
| WO | 9614207 | A1 | 5/1996 |
| WO | 9721767 | | 6/1997 |
| WO | 1998049506 | | 11/1998 |
| WO | 02060576 | A1 | 4/1999 |
| WO | 9920961 | A1 | 4/1999 |
| WO | 9920964 | A1 | 4/1999 |
| WO | 199920964 | | 4/1999 |
| WO | 200160598 | | 8/2001 |
| WO | 200202987 | | 1/2002 |
| WO | 2002052208 | | 4/2002 |
| WO | 03072684 | A1 | 9/2003 |
| WO | 03089729 | | 10/2003 |
| WO | 2004010042 | A1 | 1/2004 |
| WO | 2006045694 | | 5/2006 |
| WO | 2006073540 | A2 | 7/2006 |
| WO | 2007033836 | A1 | 3/2007 |
| WO | 2007085511 | | 8/2007 |
| WO | 2007106067 | A2 | 9/2007 |
| WO | 2008065453 | | 6/2008 |
| WO | 2008077741 | | 7/2008 |
| WO | 2008118536 | A2 | 10/2008 |
| WO | 2008122483 | A2 | 10/2008 |
| WO | 2009013106 | A2 | 1/2009 |
| WO | 2009112433 | A1 | 9/2009 |
| WO | 2009147106 | | 12/2009 |
| WO | 2010007783 | A1 | 1/2010 |
| WO | 2010029730 | | 3/2010 |
| WO | 2010043009 | | 4/2010 |
| WO | 2010092627 | | 8/2010 |
| WO | 2010127947 | | 11/2010 |
| WO | 2010127947 | A2 | 11/2010 |
| WO | 2011003711 | | 1/2011 |
| WO | 2011058678 | | 5/2011 |
| WO | 2011058678 | A1 | 5/2011 |
| WO | 2011081498 | | 7/2011 |
| WO | 2012023705 | | 2/2012 |
| WO | 2012026715 | | 3/2012 |
| WO | 2012031885 | | 3/2012 |
| WO | 2012044001 | | 4/2012 |
| WO | 2012043990 | | 5/2012 |
| WO | 2012085212 | | 6/2012 |
| WO | 2012119892 | | 9/2012 |
| WO | 2012152646 | | 11/2012 |
| WO | 2013116103 | | 8/2013 |
| WO | 2013116302 | | 8/2013 |
| WO | 2014038150 | | 3/2014 |
| WO | 2014038150 | A1 | 3/2014 |
| WO | 2014095542 | | 6/2014 |
| WO | 2014121893 | | 8/2014 |
| WO | 2014121893 | A1 | 8/2014 |
| WO | 2014184393 | | 11/2014 |
| WO | 2014184393 | A1 | 11/2014 |
| WO | 2013140816 | A1 | 8/2015 |
| WO | 2016082907 | A1 | 6/2016 |
| WO | 2017029782 | A1 | 2/2017 |
| WO | 2018199980 | | 11/2018 |

OTHER PUBLICATIONS

Raszewski et al., "Methods for Producing Hollow Glass Microspheres," Powerpoint, cached from Google, Jul. 2009, 6 pages.

feedmachinery.com, Roller Mill (2013).

Basf, "Balindur™ Solutions for fixing Vaccum Insulated Panels," web page, 4 pages, date unknown, http://performance-materials.basf.us/products/view/family/balindur, at least as early as Dec. 21, 2015.

Basf, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP +fixation+technology-English.pdf, at least as early as Dec. 21, 2015.

Kitchen Aid, "Refrigerator User Instructions," 120 pages, published Sep. 5, 2015.

Method 800 for Preparing a Core Material for Installation into an Insulated Structure

METHOD FOR PREPARING A DENSIFIED INSULATION MATERIAL FOR USE IN APPLIANCE INSULATED STRUCTURE

CROSS-REFERENCE TO RELATED APPLICATIONS

The present application is a divisional of U.S. patent application Ser. No. 18/311,277 filed May 3, 2023, now U.S. Pat. No. 12,202,175, which is a divisional of U.S. patent application Ser. No. 17/361,907 filed Jun. 29, 2021, now U.S. Pat. No. 11,691,318, which is a continuation of U.S. patent application Ser. No. 14/961,934 filed Dec. 8, 2015, now U.S. Pat. No. 11,052,579, all of which are entitled METHOD FOR PREPARING A DENSIFIED INSULATION MATERIAL FOR USE IN APPLIANCE INSULATED STRUCTURE, the entire disclosures of which are hereby incorporated herein by reference.

BACKGROUND

The device is in the field of insulating materials, specifically, insulating materials that can be densified for use in insulating structures for household appliances.

SUMMARY

In at least one aspect, a method for forming a vacuum insulated structure using a prepared core material includes preparing a powder insulation material defining a bulk density, pre-densifying the powder insulation material to form a pre-densified insulation base and crushing the pre-densified insulation base into granular core insulation to define a core density of the granular core insulation. The granular core insulation having the core density is then disposed into an insulating cavity defined within an insulating structure. Gas is expressed from the interior cavity of the insulating structure to further densify the granular core insulation to define a target density. The granular core insulation defines the target density disposed within the insulating structure that defines the vacuum insulation structure, wherein the target density defines a density in the range of from approximately 80 grams per liter to approximately 350 grams per liter.

In at least another aspect, a method for forming a vacuum insulated appliance cabinet using a prepared core material includes preparing a powder insulation material defining a bulk density, pre-densifying the powder insulation material to form a pre-densified insulation base and crushing the pre-densified insulation base into granular core insulation to define a core density of the granular core insulation. An appliance structure is provided having an outer wrapper and an inner liner, the outer wrapper and inner liner defining an insulating cavity therebetween. The granular core insulation having the core density is disposed into the insulating cavity. The insulating cavity of the appliance structure is sealed to contain the granular core insulation therein and expressing at least a portion of the gas is expressed from within the insulating cavity to form a vacuum insulated structure.

In at least another aspect, a method of preparing a core material for installation into an insulated structure includes blending a plurality of insulating components to form a powder insulation material having a bulk density, wherein the insulating components include at least one of silica, aerogel, glass fibers, and glass spheres. The powder insulation material is pre-densified to form a pre-densified insulation base and the pre-densified insulation base is then crushed to define a granular core insulation having a core density, wherein the core density is different than the bulk density and the core density is in the range of from approximately 80 grams per liter to approximately 350 grams per liter.

These and other features, advantages, and objects of the present device will be further understood and appreciated by those skilled in the art upon studying the following specification, claims, and appended drawings.

DETAILED DESCRIPTION OF EMBODIMENTS

Figure 1:
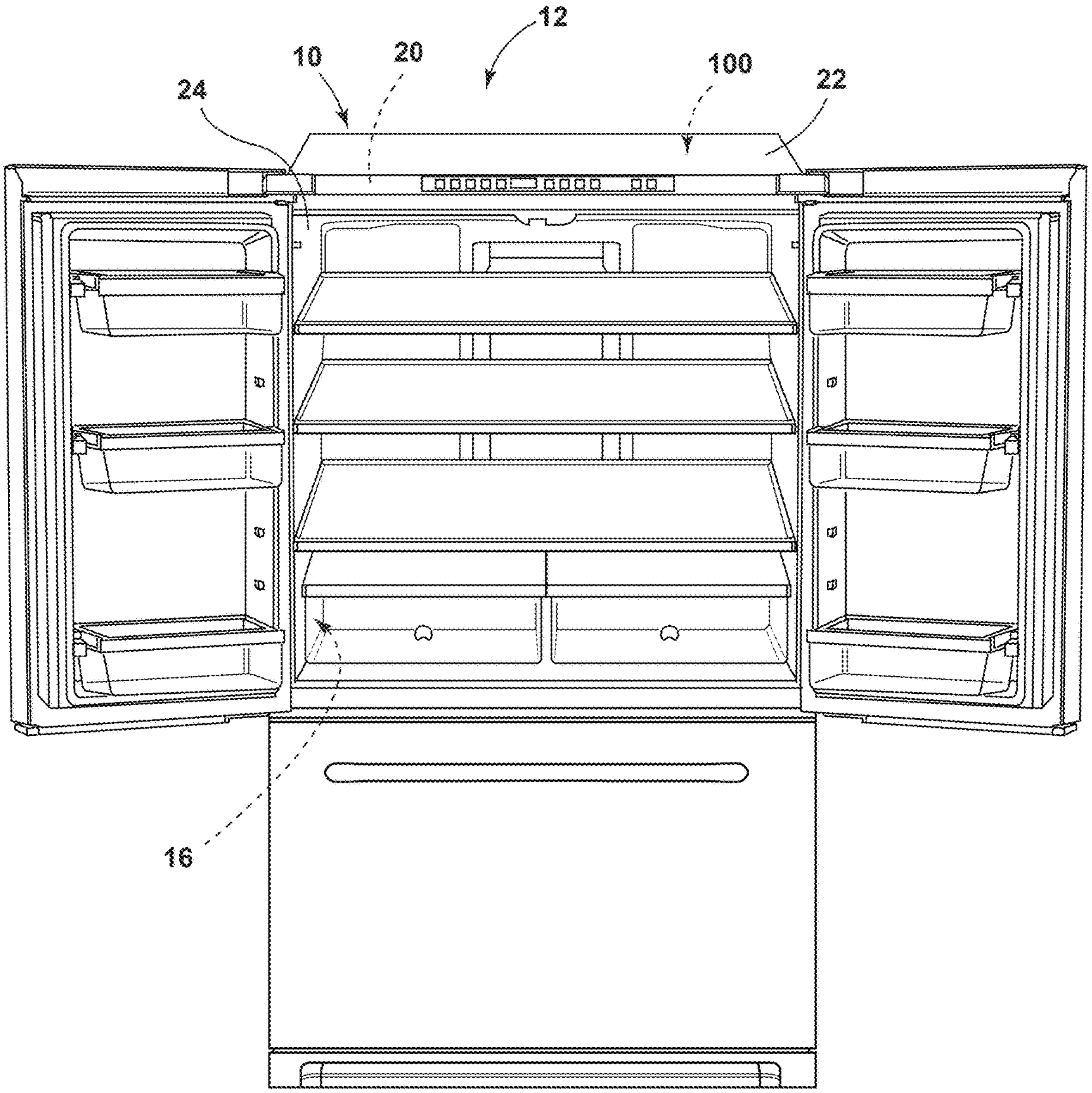
FIG. 1 is a front perspective view of a refrigerating appliance incorporating an aspect of the granular core insulation disposed within an insulating structure of the appliance.
Figure 2:
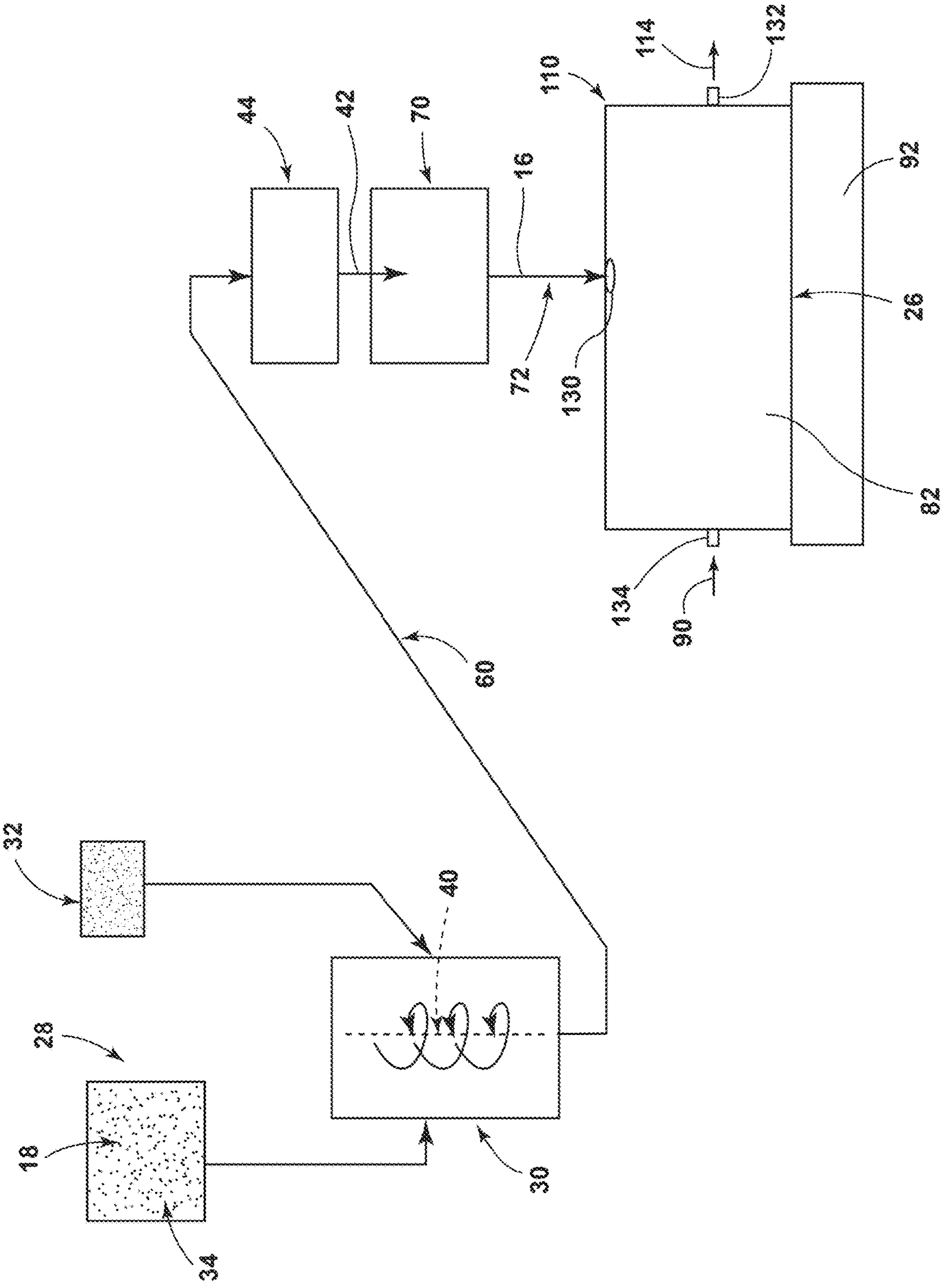
FIG. 2 is a schematic flow diagram illustrating an exemplary process for forming an aspect of the granular core insulation.
Figure 3:
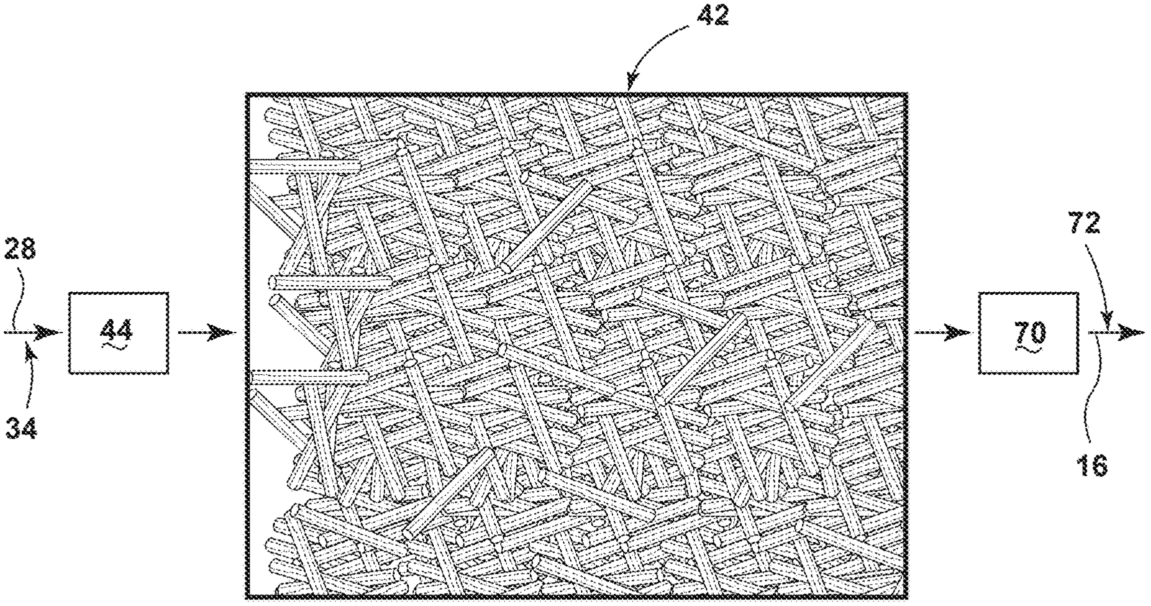
FIG. 3 is a top perspective view of an exemplary form of a pre-densified insulation base achieved after conducting a pre-densifying step of an exemplary process for forming the granular core insulation.
Figure 4:
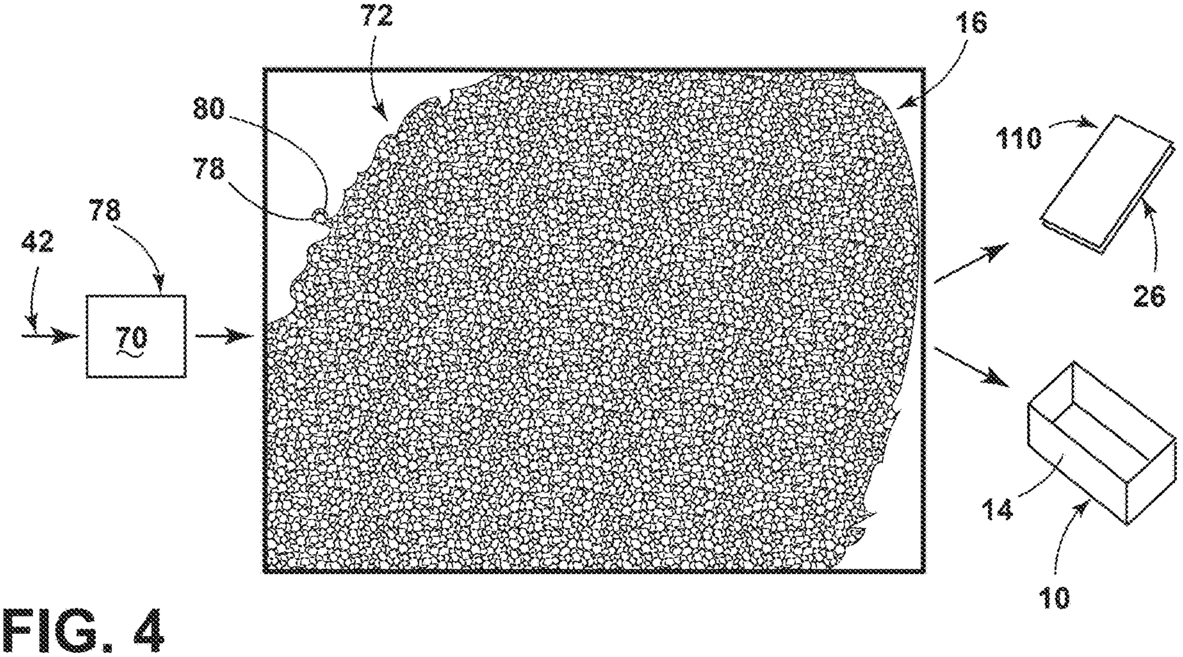
FIG. 4 is a perspective view of a crushed form of the precompacted insulation base of FIG. 3.
Figure 5:
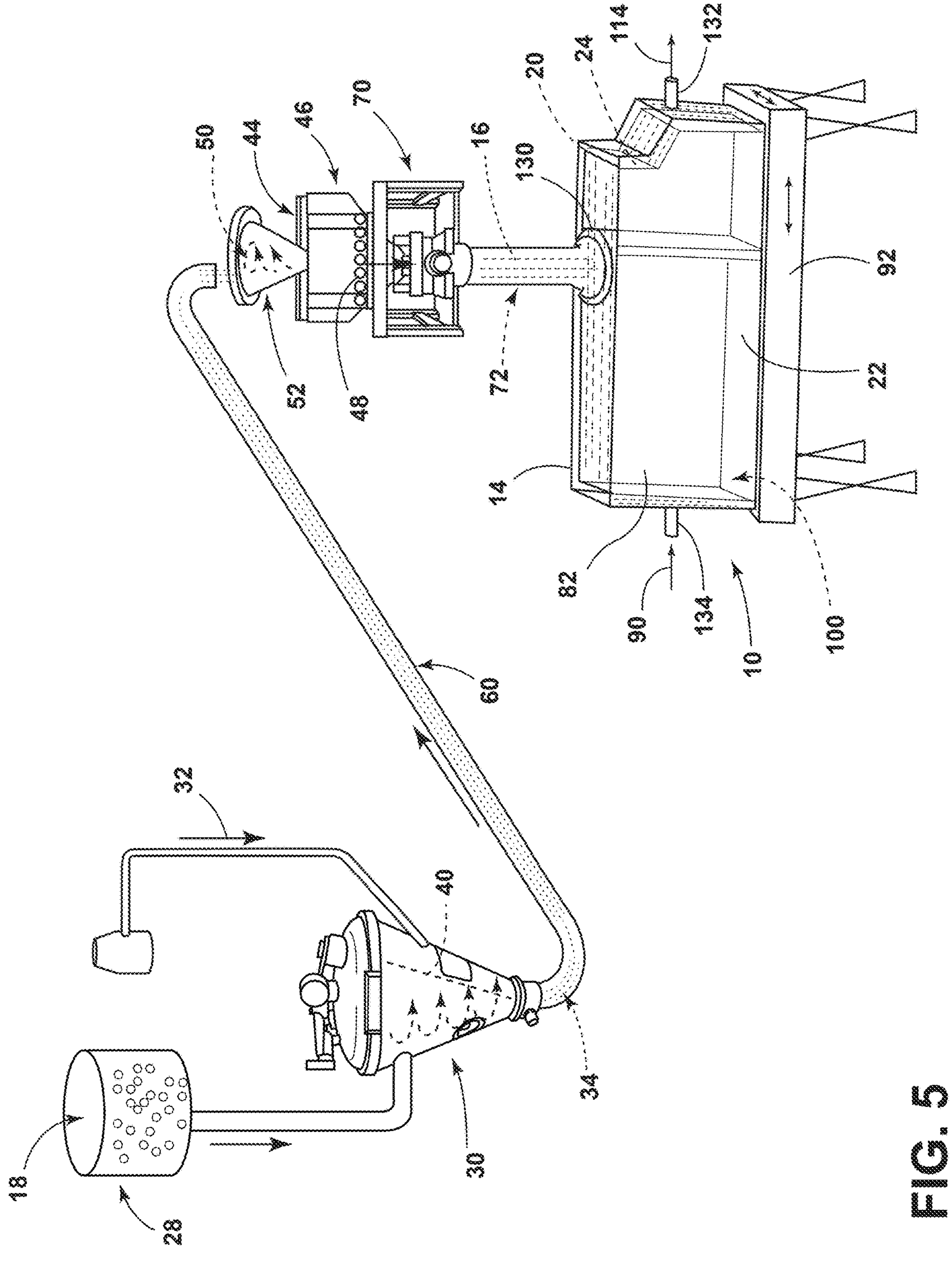
FIG. 5 is a schematic diagram illustrating an exemplary mechanism for performing an aspect for a method for forming the granular core insulation and forming an insulating structure for an appliance.
Figure 6:
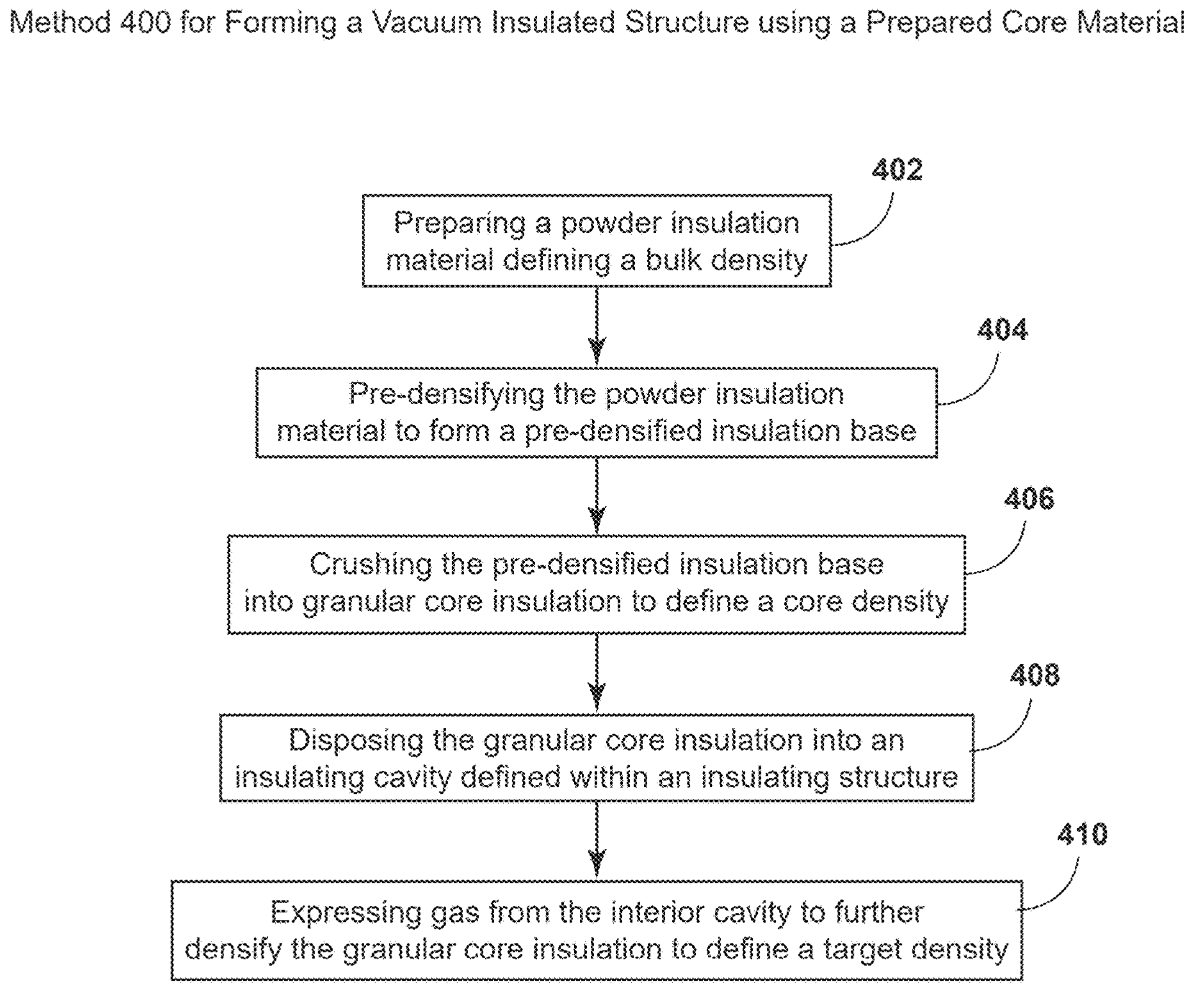
FIG. 6 is a schematic flow diagram illustrating a method for forming a vacuum insulated structure using a prepared core material.
Figure 7:
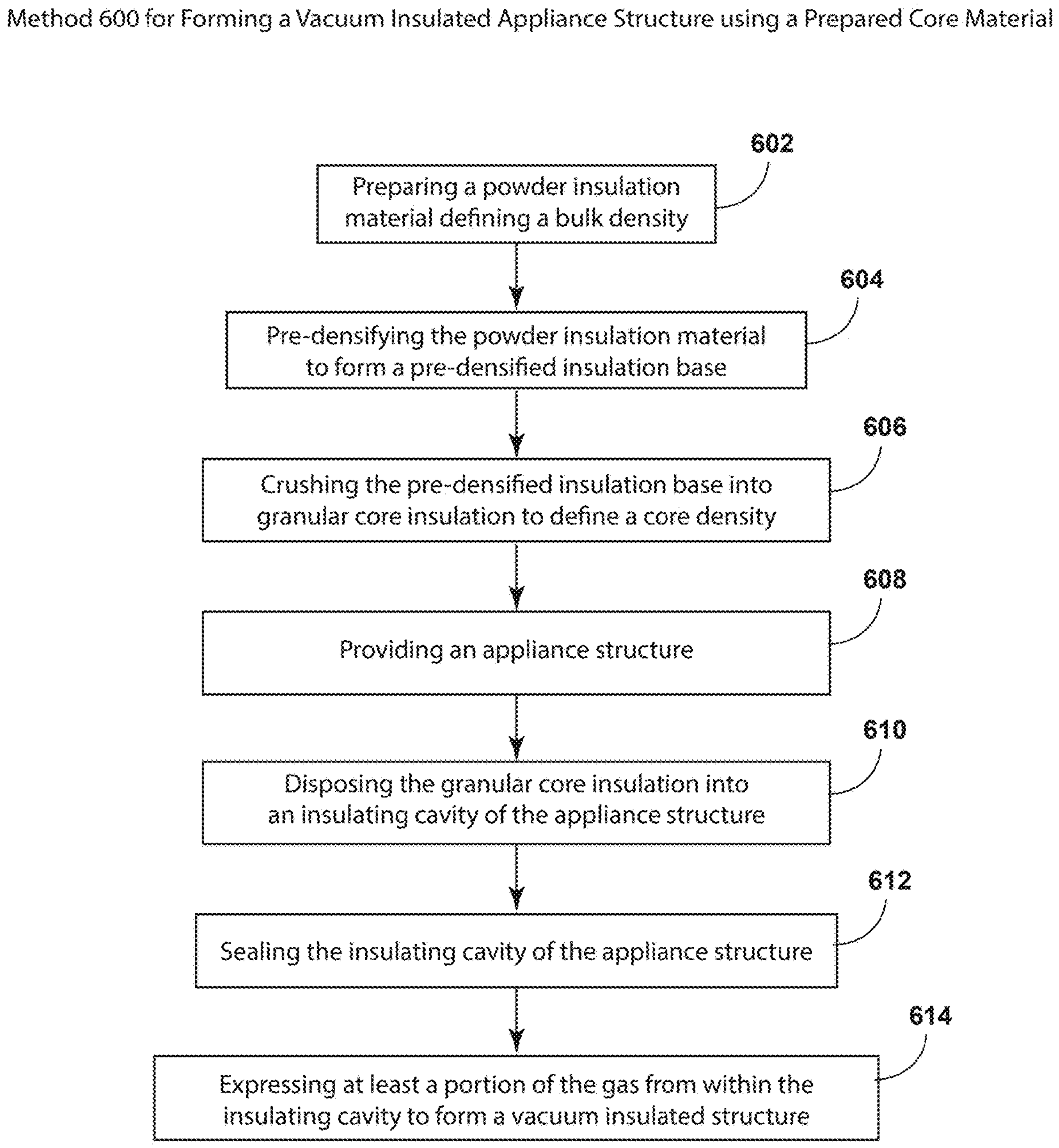
FIG. 7 is a schematic flow diagram illustrating an aspect of a method for forming a vacuum insulated appliance cabinet using a prepared core material.
Figure 8:
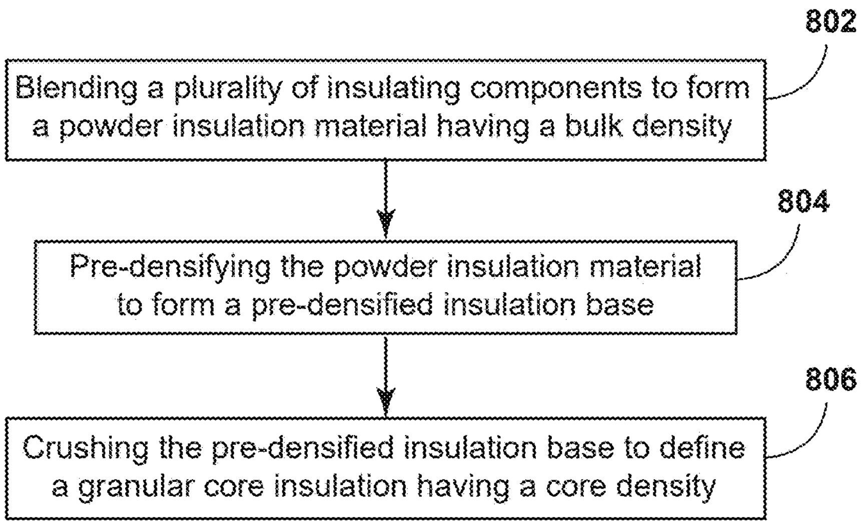
FIG. 8 is a schematic flow diagram illustrating an aspect of a method for preparing a core insulation material for installation into an insulated structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-5, reference numeral 10 generally refers to a vacuum insulated structure that is disposed within an appliance 12, such as a refrigerator, freezer, dishwasher, water heater, laundry appliance, oven, or other similar appliance or fixture that requires thermal and/or acoustical insulation within an insulated structure 14. Disposed within the insulated structure 14 is a granular core insulation 16 that includes a densified form of a powder insulation material 18. The granular core insulation 16 can be disposed directly into the insulating structure for the appliance 12, such as within an insulating cavity 20 defined between an outer wrapper 22 and an inner liner 24 of the appliance 12. Alternatively, the granular core insulation 16 can be installed within an insulating panel that is then installed as a panel member 26 within the insulating cavity 20 of the insulating structure of the appliance 12.

According to the various embodiments, as exemplified in FIGS. 1-5, the granular core insulation 16 can be prepared, according to at least one aspect, by placing a base insulation 28 into a blending apparatus 30 and combining the base insulation 28 with various additives 32 that can include, but are not limited to, various opacifiers such as carbon black, silicon carbides, titanium oxides, reinforcing materials, such as organic/inorganic fibers and organic/inorganic insulating spheres. The base insulation 28 can include various materials that can include, but are not limited to, fumed silica, precipitated silica, aerogel nano powder, silica fume, inorganic microspheres, organic microspheres, pearlite, rice husk ash, diatomaceous earth and combinations thereof, and other similar powder materials suitable for vacuum insulation structures. The blending apparatus 30 combines these various materials to form the powder insulation material 18 having a bulk density 34. It is contemplated that the powder insulation material 18 can be a nano-porous silica blend micro agglomerate having particle agglomerate sizes that are approximately 1 micron, although other larger and smaller agglomerate sizes are contemplated. The bulk density 34 of the powder insulation material 18 can be within the range of approximately 30 grams/liter to approximately 150 grams/liter. It is contemplated that greater and lesser bulk densities can be achieved depending upon the base insulation 28 and additives 32 included within the blending apparatus 30 to form the powder insulation material 18. The degree of blending, the types of additives 32, types of base insulation 28, and other factors can cause variations in the density of the powder insulation material 18.

Referring again to FIGS. 2-5, undensified silica materials and the one or more opacifiers, and other blend materials, are included within the blending apparatus 30. It is contemplated that where an opacifier is used, the opacifier within the powder insulation material 18 can be from approximately 5% to approximately 40% of the total weight of the material disposed within the blending apparatus 30. The opacifier is added to reduce radiation conduction of the silica mix. This reduction can be within the range of approximately 0.5 mw/mk to 2.0 mw/mk. It is contemplated that the blending apparatus 30 for performing the blending and/or mixing may or may not include an intensifier 40. The intensifier 40 can take various forms that can include various supplemental mixing mechanisms, injectors, combinations thereof, or other similar supplemental mechanisms that intensify the blending/mixing operations of the blending apparatus 30. An exemplary blending apparatus 30 can include a Hosokawa Vrieco-Nauta® with an intensifier 40 or any commercially available high shear mixer such as a V-block tubing mixer, a Ross mixer or similar mixer can be used to prepare this blend. Regardless of the blending apparatus 30 used, the blending apparatus 30 can be run for varying periods of time, where the blending time can depend upon the mixture volume, the various additives 32 included within the powder insulation material 18, and other factors.

Referring again to FIGS. 2-5, in order to achieve the proper density of the granular core insulation 16, the undensified powder insulation material 18 is first compacted by varying means into flakes or blanks or other densified or compacted particles of a pre-densified insulation base 42. These compacted flakes or blanks that form the pre-densified or compacted insulation base 42 have a density greater than that of the granular core insulation 16 that will be disposed within the insulated structure 14. This pre-densifying process can be accomplished by various compacting mechanisms 44, one such exemplary compacting mechanism 44 being a roller compactor 46 such as an APC L 200-50 from Hosokawa. It is contemplated that other compacting mechanisms 44 can be used to perform the pre-densifying steps of the various methods for forming the granular core insulation 16, such as vacuum compactors, presses, and others. Where a roller compactor 46 is used, the compactor may include a series of rollers 48 that serve to compact and densify the powder insulation material 18 between the rollers 48 into the blanks or flakes of the pre-densified insulation base 42 (exemplified in FIG. 3). It is contemplated, according to various aspects of the device, that during the compaction process, the powder insulation material 18 is conveyed into a roller gap of the roller compactor 46 by a cylindrical feeding auger 50 having a conical feed zone 52. Higher yield through the auger 50 can be achieved by including a vacuum de-aeration system within the feeding auger 50. The vacuum de-aeration system may be used at a base of the auger 50 or along the sides of the housing extending around the auger 50. In various embodiments, a lining can be placed on the sides proximate auger 50. Such lining can include a filter media, which may be made of various materials that include, but are not limited to, paper, synthetic material, composite or metal. It is contemplated that the use of the vacuum assist feature of the de-aeration system can serve to increase the compressive strength of the compacted/densified material.

Referring again to FIGS. 2-5, it is contemplated that delivery of the powder insulation material 18 from the blending apparatus 30 to the compacting mechanism 44 can be performed by various delivery systems 60 that can include, but are not limited to, a pumping system, a pneumatic or vacuum conveying system, belt systems, gravity fed systems, flexible screw conveying systems, combinations thereof, and other material delivery systems 60 that can deliver the powder insulation material 18 having a very minimal density.

Referring again to FIGS. 2-5, the pre-densified insulation base 42 formed through the compacting mechanism 44 can be delivered to a crushing apparatus 70 for conversion into an aspect of the granular core insulation 16. Various pressing forces can be applied to the pre-densified insulation base 42 to arrive at a granular core insulation 16 having various densities. By way of example, and not limitation, it has been found that a pressing force of 18 kN results in a core density 72 of the granular core insulation 16 of approximately 173 grams/liter. By reducing this pressing force, or by increasing the speed of the rolls through the crushing apparatus 70, granules 78 of different core density 72 can be achieved. Such core densities 72 can include ranges from approximately 80 grams/liter to 350 grams/liter. It is contemplated that depending upon the desired density of the granular core insulation 16, greater or lesser core densities 72 can be achieved by varying the pressing force from the crushing apparatus 70 or the speed at which the material moves through the crushing apparatus 70.

According to various embodiments, various other mechanisms can be used in conjunction with, or instead of, the crushing apparatus 70 to transform the pre-densified insulation base 42 into the granular core insulation 16. Such mechanisms and processes can include grinders, blenders, mixers, mills, flake crushers, combinations thereof, and other similar mechanisms that can at least partially break down the pre-densified insulation base 42.

According to the various embodiments, after the material for the granular core insulation 16 is generated through operation of the crushing apparatus 70, each granule 78 of the granular core insulation 16 can be coated by one or more binders 80 that can serve to increase the compressive strength of each granule 78. Such binders 80 can include, but are not limited to, binders that include various cellulose, wax, polyethylene glycol, gelatin, starch, polyvinyl alcohol, polymethacrylates, graphites, sodium silicates, various other organic and/or inorganic materials, and other similar materials that can serve to increase the compressive strength of each granule 78 of the granular core insulation 16. The use of the binders 80 can serve to prevent deflection of the walls 82 of the insulated structure 14 during various compacting and/or gas expressing operations. The maximum size of the individual granules 78 for the granular core insulation 16 can be controlled by the inclusion of a screen having a particular mesh size within or proximate the crushing apparatus 70, or by controlling the distance between the mills. Through the various aspects of the processes disclosed herein, granule 78 sizes between 300 nm to 5 mm can be achieved. The granules 78 on the higher size range can have increased compressive strength that can also add to the overall compressive strength of the granular core material 16. The various aspects of the process disclosed herein may produce certain fines or undensified/uncompacted material that was not densified into a granular form. This material can be captured and disposed back into a hopper or the blending apparatus 30 to be processed again.

Referring again to FIGS. 1-5, in forming the granular core insulation 16, it is contemplated that certain additives 32 can be included within the granular core insulation 16 to vary the density, and also modify the insulating properties of the granular core insulation 16. Such additives 32 can include, but are not limited to, insulating gas 90, such as argon, neon, carbon dioxide, xenon, krypton, combinations thereof, and other similar insulating gasses, insulating glass spheres, such as microspheres, nanospheres, hollow spheres, and other forms of insulating organic/inorganic spheres, additional powdered insulation material and other insulating materials. It is contemplated that the additives 32 can be included within the granular core insulation 16 such that an insulating material occupies substantially all of the space within the insulating cavity 20 of the insulated structure 14 when the granular core insulation 16, and the additives 32 are included within the insulating cavity 20 of the insulated structure 14. To assist with the deposition of the granular core insulation 16 and the various additives 32 within the insulated structure 14, various vibrating mechanisms 92 can be implemented to position the various materials in a packed configuration with minimal spaces between particles. Such a vibrating mechanism 92 can be a vibration table that vibrates the entire insulated structure 14. It is contemplated that vibration with low frequency and high impact may yield higher efficiency or better packing of the granular core material 16 within the insulating cavity 20. More efficient packing can serve to increase the compressive strength of the granular core material 16. Alternatively, the vibrating mechanism 92 can be an apparatus that is temporarily placed within the insulating cavity 20 to directly vibrate the various particles of the granular core insulation 16 and the various additives 32.

Referring again to FIGS. 2-5, once the granular core insulation 16 is prepared, it may be necessary to dry the granular core insulation 16 before being disposed within an insulated structure 14 or before being transported to another location for use in any one of various applications. When the granular core insulation 16 is dried and prepared for installation into the insulated structure 14, the granular core insulation 16 can be directly fed into the insulating cavity 20 of the insulated structure 14. By way of example, and not limitation, the granular core insulation 16 can be fed directly into the insulating space defined between an inner liner 24 and an outer wrapper 22 of an insulated structure 14 for an appliance 12. Alternatively, the granular core insulation 16 can be disposed within the insulating cavity 20 of a panel member 26, such that the granular core insulation 16 within the panel member 26 can be formed into a vacuum insulation panel that can be, in turn, installed within the insulating cavity 20 of the insulation structure of an appliance 12. Disposing techniques such as a double diaphragm powder pump, an auger feed, and a flexible screw conveyor can also be used.

Referring now to FIGS. 2-6, having described the process for forming the granular core insulation 16, a method 400 is now disclosed for forming a vacuum insulated structure 10 using a prepared core material, such as the granular core insulation 16. According to the method 400, a powdered insulation material defining a bulk density 34 is prepared. As discussed above, preparation of the powder insulation material 18 can be through the use of a blending apparatus 30, where the powder insulation material 18 includes various insulating materials that can include, but are not limited to, various silica powder, aerogel powder, organic/inorganic fibers, and organic/inorganic micro-nano spheres, pearlite, rice husk ash, diatomaceous earth, and other similar powder type insulation materials (step 402). Once the powder insulation material 18 is prepared, the powder insulation material 18 is pre-densified/compacted to form a pre-densified insulation base 42 (step 404). The pre-densifying step can be accomplished by various compacting operations, such as by a roller compactor 46 or a briquetting machine, vacuum packing, mechanical pressing, or other apparatus that can provide a compressive force against the powder insulation material 18 to form the pre-densified insulation base 42. After forming the pre-densified insulation base 42, the pre-densified/compacted insulation base 42 is crushed into the granular core insulation 16 to define a core density 72 of the granular core insulation 16 (step 406).

According to the various embodiments, the various densifying and pre-densifying steps of the methods disclosed herein can take the form of any one or more processes through which the base insulation 28 is processed into the granular core insulation 16. Such densification processes can include compaction, pressing, rolling, or other similar application of a positive compressive force. It is also contemplated that the densification of the base insulation 28 into the granular core insulation 16 can be accomplished through the extraction of gas, vacuum packing, or other similar application of a negative compressive force. Combinations of the positive and negative compressive forces can also be implemented to form the pre-densified insulation base 42 and/or the granular core insulation 16.

According to the various embodiments, the core density 72 can be less than a target density 100 of the granular core insulation 16. It is contemplated that the core density 72 of the granular core insulation 16 can be provided such that further and finite densification of the granular core insulation 16 can take place during subsequent steps of the process of forming the vacuum insulated structure 10.

Once the granular core insulation 16 having the core density 72 is prepared, the granular core insulation 16 is disposed within an insulating cavity 20 defined within an insulated structure 14 (step 408). As discussed above, the insulated structure 14 can be an insulating structure for an appliance cabinet made from an inner liner 24 and an outer wrapper 22. The insulated structure 14 can also be a panel member 26 that can be used to form a vacuum insulated panel 110 for separate installation within the insulating cavity 20 of the insulated structure 14 for the appliance 12 (step 408). It is contemplated that once the granular core insulation 16 is disposed within the insulating cavity 20, gas 114 can be expressed from the interior cavity of the insulated structure 14 to form the vacuum insulated structure 10 (step 410). As discussed above, further densification of the granular core insulation 16 can occur as gas 114 is being expressed from the interior cavity. In this manner, the granular core insulation 16 having the core density 72, can be further densified into the target density 100 of the granular core insulation 16.

According to the various embodiments, it is contemplated that as gas 114 from within the insulating cavity 20 is expressed, an insulating gas 90 can be injected into the interior cavity, such that the insulating gas 90 replaces air or some other gas 114 having lesser insulating characteristics than the insulating gas 90. Where the insulating gas 90 is injected as the lesser insulating gas 90 is being expressed, it is contemplated that the expression of gas 114 from the interior cavity may not result in further densification of the granular core insulation 16. In such an embodiment, it is contemplated that the crushing step 406 of the pre-densified insulation base 42 into the granular core insulation 16 can result in the core density 72 being substantially similar to the target density 100 desired for the design of the insulated structure 14 of the appliance 12.

Referring again to FIGS. 2-5, it is contemplated that the insulated structure 14 can include the interior insulating cavity 20 and can also include an insulation inlet 130 and a vacuum outlet 132. In such an embodiment, the insulation inlet 130 can be used to dispose the granular core insulation 16, as well as various additives 32, within the interior insulating cavity 20 of the insulated structure 14. Once the proper amount of granular core insulation 16 and additives 32 are installed therein, the insulation inlet 130 can be sealed. The vacuum outlet 132 of the insulated structure 14 can be used, as discussed above, to express gas 114 from the interior cavity of an insulated structure 14. The gas inlet 134 can also be included where the gas inlet 134 provides a conduit through which the insulating gas 90 can be injected as the lesser insulating gas 90 is expressed. Once the various gas injecting/gas expressing steps are completed, each of the gas inlet 134 and vacuum outlet 132 are sealed, thereby hermetically sealing the insulated structure 14 to prevent the dissipation or other loss of insulating gas 90.

Referring now to FIGS. 2-5 and 7, a method 600 is also disclosed for forming an insulated structure 14 in the form of a vacuum insulated cabinet using a prepared core material such as the granular core insulation 16. According to the method 600, the base insulation 28, typically a powder, is prepared, substantially as described above, to create the powder insulation material 18 having the bulk density 34 (step 602). The powder insulation material 18 is then pre-densified to form the pre-densified insulation base 42 (step 604). The pre-densified insulation base 42 is then crushed into the granular core insulation 16 to define either the core density 72 or the target density 100 for the granular core insulation 16 (step 606). As discussed above, the core density 72 of the granular core insulation 16 may be less than the target density 100 of the granular core insulation 16 where further densifying steps may be performed upon the granular core insulation 16 before the vacuum insulated structure 10 is completed. Such further densifying steps, as discussed above, can include, but are not limited to, compressing the granular core insulation 16 through the expression of gas 114 from the interior cavity, further physical compression of the granular core insulation 16 and/or placing of additives 32 within the granular core insulation 16. Where additives 32 are used, the additives 32 can include, but are not limited to, organic/inorganic hollow spheres, pearlite, rice husk ash, diatomaceous earth with binders and opacifiers, insulating gas 90, glass fiber, additional powder insulation material 18 in an uncompacted form, or other similar insulation material.

Referring again to FIGS. 2-5 and 7, according to the method 600, an insulating appliance structure of an appliance 12 made from an outer wrapper 22 and an inner liner 24 can be provided (step 608). The outer wrapper 22 and inner liner 24 are sealed together to define an insulating cavity 20 therebetween. The granular core insulation 16 having either the core density 72 or the target density 100 is then disposed into the insulating cavity 20 of the appliance structure (step 610). The insulating cavity 20 is then sealed at the insulation inlet 130 such that only gas 114 can be injected into or removed from the insulating cavity 20 via the vacuum inlet and/or vacuum outlet 132 (step 612). After the proper amount of granular core insulation 16 is disposed within the insulating cavity 20, at least a portion of the gas 114 is expressed from within the insulating cavity 20 to form a vacuum insulated structure 10 (step 614). As discussed above, as gas 114 is expressed from the insulating cavity 20, insulating gas 90 can be injected into the insulating cavity 20 such that the insulating gas 90 replaces the gas 114 being expressed. Sealing of the insulating cavity 20 is necessary as the insulating gas 90 will disperse, dissipate, or otherwise escape, from the insulating cavity 20 to the atmosphere through any unsealed portion of the insulated structure 14.

According to the various embodiments, the granular core insulation 16 can include one or more binders 80 to increase the compressive strength of each granule 78 of the granular core insulation 16. The increased compressive strength of each granule 78 can serve to prevent deflection of the outer wrapper 22 and/or the inner liner 24 during compression of the granular core insulation 16 and/or as gas 114 is being expressed from the insulating cavity 20 during formation of the vacuum insulated structure 10. The increased compressive strength of the granular core insulation 16, at least partially, withstands the inward deflection of the outer wrapper 22 and inner liner 24 to maintain a substantially consistent thickness of the insulating cavity 20 of the vacuum insulated structure 10.

According to the various embodiments, the inner liner 24 and outer wrapper 22 of the appliance structure can be made of various rigid materials that can form a hermetic seal when attached together. Typically, both the inner liner 24 and outer wrapper 22 will be made of the same material, such as both being metal, both being a high barrier polymer-type material, or other similar material that can be hermetically sealed together. It is also contemplated, that in various embodiments, the outer wrapper 22 can be metal and the inner liner 24 can be plastic, or vice versa, or the outer wrapper 22 and inner liner 24 can be made of various other similar or differing materials that can be hermetically sealed together to form the vacuum insulated structure 10.

Referring now to FIGS. 2-5 and 8, a method 800 is disclosed for preparing a core insulation material for installation into an insulated structure 14. According to the method 800, a plurality of insulating components are blended to form a powder insulation material 18 having a bulk density 34 (step 802). As discussed above, these insulating components can include at least one of silica powder, aerogel powder, organic/inorganic fibers, and organic/inorganic micro-nano spheres, pearlite, rice husk ash, diatomaceous earth with opacifiers like carbon black and silicon carbide as well as with some binders that include various cellulose, wax, polyethylene glycol, gelatin, starch, polyvinyl alcohol, polymethacrylates and other organic materials as well as inorganic material such as sodium silicates. The powder insulation material 18 is then pre-densified to form a pre-densified insulation base 42 (step 804). The pre-densified insulation base 42 is then crushed to define a granular core insulation 16 having a core density 72, where the core density 72 is more dense than the bulk density 34 (step 806).

According to the various aspects of the methods disclosed herein, it is contemplated that an insulating gas carrier 90 can be used to assist in the movement of the base insulation 28 through the blending apparatus 30, the delivery system 60, the compacting mechanism 44 and/or the crushing apparatus 70. In such an embodiment, it is further contemplated that at least the blending apparatus 30, compacting mechanism 44 and the crushing apparatus 70 can be housed within a closed system. This closed system can include various inlet and outlet valves through which gas 114 and insulating gas 90 can be injected and/or expressed. Through the use of insulating gasses 90, the base insulation 28, and ultimately the granular core insulation 16 can be delivered from the closed system of the blending apparatus 30, compacting mechanism 44 and the crushing apparatus 70 into the insulating cavity 20 of the insulated structure 14. The transport of the granular core insulation 16 into the insulating cavity 20 is assisted by the flow of the insulating gas 90 and the insulating gas 90 is thereby delivered into the insulating cavity 20 to act as an additional insulating material. The insulating gas 90 can include, but is not limited to, argon, krypton, neon, carbon dioxide, xenon, combinations thereof and other insulating gasses 90.

According to the various embodiments, it is contemplated that the granular core insulation 16 can then be installed within an insulated structure 14, such as an appliance cabinet, vacuum insulating panel, or other similar insulating structure. It is also contemplated that the granular core insulation 16 can then be packaged for shipment to other locations for use in varying applications.

According to the various embodiments, it is contemplated that the granular core insulation 16 can be used during the manufacture of various fixtures and/or appliances 12 requiring at least some insulation. Such appliances 12 can include, but are not limited to, water heaters, ductwork, fluid piping, household wall/roof insulation, vehicle insulation, insulation for various household and commercial appliances, and other similar applications. Typically, the granular core insulation 16 will be used for household appliances that can include, but are not limited to, refrigerators, freezers, dishwashers, laundry appliances, ovens, water heaters and other similar household appliances. Additionally, it is contemplated that the granular core insulation 16 can be directly installed within the insulating cavity 20 for an appliance cabinet without using additional barrier films, vapor barriers, or other sealing mechanisms. In such an embodiment, the granular core insulation 16 is installed directly within the insulating cavity 20 defined between the outer wrapper 22 and inner liner 24 of the insulating structure for the appliance 12. It is also contemplated that the granular core insulation 16 can be fed into a flexible vacuum envelope or bag to make a two-dimensional or three-dimensional vacuum insulated panel 110 that can be later installed within the insulated structure 14 for the appliance 12. It is also contemplated that the insulated structures 14 for appliances 12 can include structures for the cabinet, doors, door panels, drawers, and other components of the appliance 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for forming a vacuum insulated appliance cabinet using a prepared core material, the method comprising steps of:

roller compacting a pre-densified insulation base;

roller crushing the pre-densified insulation base into adhered granules of a core insulation material to define a core density of the core insulation material, wherein the pre-densified insulation base and the core insulation material includes powder insulating particles that are adhered together during the compacting and crushing steps;

disposing the core insulation material into a cavity of an insulating structure having an outer wrapper and an inner liner;

disposing an insulating gas into the cavity;

sealing the cavity of the insulating structure to contain the core insulation material therein; and expressing at least a portion of the insulating gas from within the insulating structure to form a vacuum insulated structure.

2. The method of claim 1, wherein the core density of the core insulation material is equivalent to a target density for the vacuum insulated structure, wherein the step of expressing at least a portion of the insulating gas is substantially free of compression of the core insulation material.

3. The method of claim 1, wherein the step of expressing at least a portion of the insulating gas further densifies the core insulation material to be compressed from the core density to a target density, wherein the target density is different than the core density.

4. The method of claim 1, wherein the outer wrapper is metal.

5. The method of claim 1, wherein the pre-densified insulation base is a mixture of a plurality of insulating components, where the insulating components include at least one of silica powder, aerogel powder, insulating fibers, insulating spheres, perlite, rice husk ash, diatomaceous earth and an opacifier.

6. The method of claim 1, wherein the pre-densified insulation base is combined in a blending operation in a blending apparatus having an intensifier mechanism for performing the blending operation.

7. The method of claim 1, wherein the insulating structure includes the cavity and an insulation inlet and a vacuum outlet, the insulation inlet and the vacuum outlet defining communication between the cavity and an exterior of the insulating structure.

8. The method of claim 3, wherein the insulating gas includes at least one of argon, neon, carbon dioxide, xenon, and krypton.

9. The method of claim 3, wherein the target density defines a density in a range of from approximately 80 grams per liter to approximately 350 grams per liter.

10. A method for forming a vacuum insulated cabinet using a prepared core material, the method comprising steps of:

forming a pre-densified insulation base using a compacting mechanism;

crushing the pre-densified insulation base using a rolling mechanism to form a granulated insulating material having a core density;

disposing the granulated insulating material into a cavity of an insulating envelope;

sealing the cavity of the insulating envelope to contain the granulated insulating material therein; and expressing at least a portion of gas from within the insulating envelope to form a vacuum insulated structure.

11. The method of claim 10, wherein the pre-densified insulation base and the granulated insulating material includes powder insulating particles that are adhered together during the forming and crushing steps.

12. The method of claim 10, further comprising a step of disposing an insulating gas into the cavity, wherein the step of expressing at least a portion of the gas includes expressing at least a portion of the insulating gas.

13. The method of claim 11, wherein the core density of the granulated insulating material is equivalent to a target density for the vacuum insulated structure, wherein the step of expressing at least a portion of the gas is substantially free of compression of the granulated insulating material.

14. The method of claim 12, wherein the step of expressing at least a portion of the insulating gas further densifies the granulated insulating material to be compressed from the core density to a target density, wherein the target density is different than the core density.

15. The method of claim 10, wherein the insulating envelope is metal.

16. The method of claim 10, wherein the pre-densified insulation base is a mixture of a plurality of insulating components, where the insulating components include at least one of silica powder, aerogel powder, insulating fibers, insulating spheres, perlite, rice husk ash, diatomaceous earth and an opacifier.

17. The method of claim 10, wherein the pre-densified insulation base is combined in a blending operation in a blending apparatus having an intensifier mechanism for performing the blending operation.

18. The method of claim 14, wherein the target density defines a density in a range of from approximately 80 grams per liter to approximately 350 grams per liter.

19. A method for forming a vacuum insulated member using, the method comprising steps of: preparing a pre-densified insulation base; processing the pre-densified insulation base into adhered granules of a core insulation using a crushing device having rollers to define a core density of the core insulation; disposing the core insulation into a cavity of a metallic insulating envelope; replacing at least a portion of a gas present within the cavity with an insulating gas; sealing the cavity of the metallic insulating envelope to contain the core insulation and the insulating gas therein; and expressing at least a portion of the insulating gas from within the metallic insulating envelope to form a vacuum insulated structure.

20. The method of claim 19, wherein the pre-densified insulation base is a mixture of a plurality of insulating components, where the insulating components include at least one of silica powder, aerogel powder, insulating fibers, insulating spheres, perlite, rice husk ash, diatomaceous earth and an opacifier.

* * * * *